(12) United States Patent
Kosaka et al.

(10) Patent No.: US 6,856,072 B2
(45) Date of Patent: Feb. 15, 2005

(54) ULTRASONIC DRIVING MECHANISM

(75) Inventors: Akira Kosaka, Yao (JP); Minoru Kuwana, Osaka (JP); Yoshiharu Tanaka, Kawachinagano (JP); Junichi Tanii, Izumi (JP); Kenji Mizumoto, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/922,926

(22) Filed: Aug. 7, 2001

(65) Prior Publication Data

US 2002/0067105 A1 Jun. 6, 2002

(30) Foreign Application Priority Data

Aug. 8, 2000 (JP) ........................................ 2000-239727

(51) Int. Cl.[7] .............................................. H01L 41/08
(52) U.S. Cl. ................................................. 310/323.02
(58) Field of Search ......................... 310/323.02, 323.04

(56) References Cited

U.S. PATENT DOCUMENTS

| | | | | |
|---|---|---|---|---|
| 4,453,103 A | * | 6/1984 | Vishnevsky et al. | 310/323.02 |
| 4,884,002 A | * | 11/1989 | Eusemann et al. | 310/323.04 |
| 4,950,135 A | * | 8/1990 | Tojo et al. | 310/323.04 |
| 4,959,580 A | * | 9/1990 | Vishnevsky et al. | 310/323.02 |
| 5,900,691 A | * | 5/1999 | Reuter et al. | 310/323.02 |
| 5,952,766 A | * | 9/1999 | Mukohjima et al. | 310/323.04 |
| 6,201,340 B1 | * | 3/2001 | Matsuda et al. | 310/323.02 |

FOREIGN PATENT DOCUMENTS

| | | |
|---|---|---|
| JP | 55-125052 | 9/1980 |
| JP | 58-093477 | 6/1983 |
| JP | 06-269181 | 9/1994 |
| JP | 08-047272 | 2/1996 |
| JP | 08-196092 | 7/1996 |
| JP | 09-298894 | 11/1997 |
| JP | 2000-023475 | 1/2000 |

* cited by examiner

*Primary Examiner*—Mark Budd
(74) *Attorney, Agent, or Firm*—McDermott Will & Emery LLP

(57) ABSTRACT

An ultrasonic drive apparatus for preventing a slip between an object to be driven and a driving part of the apparatus to drive the object. The driving part includes an elastic member through which vibrations from electrical-mechanical converters are transmitted to the object. The elastic member can deform in a direction in which the object is driven. The driving part makes a predetermined locus to drive the object while the elastic member deforms in the direction so as to absorb the slip between the object and the driving part. The elastic member and the converters are mounted symmetrically relative to an axis which is generally perpendicular to the direction in which the object is driven, so that the object can be driven forward and backward.

15 Claims, 12 Drawing Sheets

ULTRASONIC DRIVING MECHANISM

This application is based upon application No. 2000-239727 filed in Japan, the contents of which are hereby incorporated by reference.

BACKGROUND OF THE INVENTION

1. Field of the Invention

The present invention relates to an ultrasonic (or supersonic) driving mechanism, such as an ultrasonic actuator and an ultrasonic motor, utilizing an electrical-mechanical energy converter such as a piezoelectric vibration element.

2. Description of the Related Arts

With reference to FIG. 1, an example of a conventional ultrasonic actuator of truss type, as an ultrasonic driving mechanism, is described below. As shown in FIG. 1, the ultrasonic actuator has a base 1 to which a pair of elongate piezoelectric vibrators 2 and 3 are fixed, for example, by means of adhesive. Each of the elongate piezoelectric vibrators 2 and 3 is composed of a plurality of piezoelectric plates which are laminated, or layered, one over another. The pair of elongate piezoelectric vibrators 2 and 3 are fixed to the base 1 with a predetermined angle between the pair of vibrators 2 and 3. The apexes of the vibrators 2 and 3 are fixed to each other via a resultant part 4 made of a rigid body, for example, by means of adhesive.

When an unshown control circuit applies a voltage having a predetermined phase difference to the piezoelectric vibrators 2 and 3, they expand and contract (i.e. vibrate) respectively with the phase difference therebetween. Thereby, the resultant part 4 makes an elliptical motion. A pressurizing portion, constituted by a spring 7, presses the resultant part 4 against a surface of a to-be-driven member (i.e. a member to be driven) 8. Thereby, the to-be-driven member 8 is driven to rotate about a rotational center C at a predetermined circumferential speed of Vr.

By the way, the to-be-driven member 8 which is driven by the ultrasonic actuator, is not limited to a rotor as shown in the figure. Namely, the to-be-driven member 8 can be a member which moves linearly.

FIG. 2 illustrates the elliptical motion of the resultant part 4 shown in FIG. 1. A point "A" in the elliptical locus shows a point at which the resultant part 4 starts to contact the to-be-driven member 8. A point "B" shows another point at which the resultant part 4 is detached from the to-be-driven member 8. A point "C" shows the intermediate point between the points "A" and "B". Because the resultant part 4 is made of the rigid body, it draws the elliptical locus shown in FIG. 2, irrespective of whether the resultant part 4 contacts with the to-be-driven member 8. That is, components $V_{AX}$, $V_{BX}$, and $V_C$ of speed at the points A, B, and C in the X-axis direction are kept at a constant value, respectively, irrespective of whether the resultant part 4 contacts with the to-be-driven member 8. As a result, there occurs a slip between the resultant part 4 and the to-be-driven member 8, which causes an energy loss.

On the other hand, Japanese Laid-Open Patent Publication No. 55-125052, discloses an actuator in which vibrations are transmitted, or imparted, to its to-be-driven member via an elastically deformable member which is in the form of a projection. With the arrangement, it is possible to prevent a slip between the elastically deformable member and the to-be-driven member. But the deformable member extends with a state in which the deformable member inclines at a certain angle with respect to the to-be-driven member. Thus, with the arrangement, the to-be-driven member can be driven in only one direction. If a pair of actuators are arranged to the to-be-driven member, it is not possible to drive the to-be-driven member properly, because there exists such a problem that when the to-be-driven member tries to be driven by one actuator, the elastically deformable member in the form of the projection of the other actuator interferes with that of the above one actuator.

SUMMARY OF THE INVENTION

Therefore, one object of the present invention is to provide a driving mechanism such as an actuator and a motor, especially to provide an ultrasonic driving mechanism such as an ultrasonic actuator and an ultrasonic motor, in which a driving part of the driving mechanism is prevented from slipping on an object, or body, to be driven by the driving part so that high performance with high efficiency in driving the object is realized.

Another object of the present invention is to provide the driving mechanism, in which a contact part as the driving part moves elliptically, and in which the contact part is prevented from slipping on the object, or body, to be driven by the contact part so that high performance with high efficiency in driving the object is realized.

Still another object of the present invention is to provide the driving mechanism, in which an elastically deformable part as the driving part moves elliptically, in which the elastically deformable part is prevented from slipping on the object, or body, to be driven by the elastically deformable part so that high performance with high efficiency in driving the object or body is realized, and in which the object, or body, can be driven forward and backward by the elastically deformable part.

Still another object is to provide the ultrasonic motor, in which a ring-shaped rotor as an object, or body, to be driven, is driven to rotate by a stator ring as the driving part, and in which the stator ring is prevented from slipping on the rotor so that high performance with high efficiency in driving the rotor is realized.

In accomplishing these and other objects of the present invention, according to one aspect of the present invention, there is provided a driving mechanism which comprises: a base; a first displacement part which has a pair of ends and which can expand and contract between the pair thereof, in which one of the pair is supported by the base; a second displacement part which has a pair of ends and which can expand and contract between the pair thereof, in which one of the pair is supported by the base; and a resultant part which connects the other of the pair of the first displacement part and the other of the pair of the second displacement part to each other, in which the resultant part has a contact part that contacts a body to be driven by the contact part, wherein the contact part can elastically deform in a direction in which the body is driven by the contact part.

According to the construction, for example, when signals of frequencies with, a predetermined phase difference therebetween are applied to the first displacement part and the second displacement part, the vibrations thereof are synthesized, for example into elliptical motion, at the resultant part, and the synthesized vibration at the resultant part is transmitted, or imparted, to the body via the elastically deformable contact part. With the construction, the contact part elastically deforms to the motion, or movement, of the body with the contact part contacting the body. As a result, any slip, or, sliding, between the contact part and the object is effectively prevented, and high performance with high efficiency in driving the object or body is surely realized. In other words, with the construction, energy loss between the body and the resultant part is effectively reduced, and high power driving is surely realized.

The signals can have frequencies which belong to a region of ultrasonic.

In the above construction, there can be provided a driver which supplies the first displacement part with a first driving signal having a first phase and which supplies the second displacement part with a second driving signal having a second phase, in which the first phase is in one of a first state in which the first phase is faster than the second phase by a predetermined phase difference, and a second state in which the first phase is slower than the second phase by a predetermined phase difference. According to the construction, it is possible to move the contact part elliptically in a forward or a backward direction selectively.

In the above construction, it is preferable that the contact part is constituted by an elastic projecting part, and that material and configuration of the base, of the first displacement part, of the second displacement part, and of the resultant part are selected so that resonant frequency of the elastic projecting part in the direction in which the body is driven is generally equal to resonant frequency of the first displacement part and the second displacement part in a direction perpendicular to the direction in which the body is driven.

The material and configuration can be selected, for example, by utilizing computer simulation.

According to the construction, the motion or movement at the contact part is amplified, so that much higher efficiency and driving power are realized.

In the construction, it is preferable that the first displacement part, the second displacement part, the resultant part, and the contact part are provided generally symmetrically with respect to an axis which is generally perpendicular to the direction in which the body is driven, and that the body can be driven forward and backward by the contact part.

In the construction, it is preferable that driving force which the contact part exerts upon the body is equal to or smaller than frictional resistance which is gained by multiplying normal (or vertical or perpendicular) resistance which the contact part exerts upon the body, by frictional coefficient between the contact part and the body.

According to the construction, any possibility of the slip between the contact part and the body, or object, to be driven is more efficiently lessened.

In accomplishing the above objects of the present invention, according to another aspect thereof, there is provided a driving mechanism which comprises: a first displacement part which has a pair of ends and which can expand and contract between the pair thereof; a second displacement part which has a pair of ends and which can expand and contract between the pair thereof; a resultant part which connects one of the pair of the first displacement part and one of the pair of the second displacement part to each other, in which the resultant part has a contact part that contacts a body to be driven by the contact part; and a base for supporting the other of the pair of the first displacement part and the other of the pair of the second displacement part so that the contact part can have a displacement in a direction in which the body is driven by the contact part.

In accomplishing the above objects of the present invention, according to still another aspect thereof, there is provided an ultrasonic driving mechanism which comprises: an object to be driven; at least one pair of electrical-mechanical energy transducers which vibrate with predetermined different phases to cause a resultant elliptical vibration, in which the electrical-mechanical energy transducers are provided generally symmetrically with respect to an axis that is generally perpendicular to a direction in which the object is driven; and an elastically deformable part which is provided generally symmetrically with respect to the axis, in which the resultant elliptical vibration is transmitted to the object via the elastically deformable part, wherein the object can be driven forward and backward by the elastically deformable part.

In accomplishing the above objects of the present invention, according to still another aspect thereof, there is provided an ultrasonic motor which comprises: a stator ring which has a ring-shaped piezoelectric vibrator and a ring-shaped elastic member combined to the ring-shaped piezoelectric vibrator, in which the ring-shaped elastic member has an elastic piece; and a ring-shaped rotor which is pressed against a tip portion of the elastic piece of the ring-shaped elastic member, in which the ring-shaped rotor is driven to rotate by the stator ring, wherein the elastic piece can deform in a direction in which the ring-shaped rotor is driven to rotate by the stator, so that the elastic piece is prevented from slipping relative to the ring-shaped rotor.

In the construction, any object, or body to be driven by the ultrasonic motor, can be connected to the ring-shaped rotor.

In the construction, the ring-shaped elastic member can have a plurality of elastic pieces which are arranged along the circumference of the ring-shaped elastic member.

With the construction, the tip portion of the elastic piece of the ring-shaped elastic member is prevented from slipping on the rotor so that high performance with high efficiency in driving the rotor is realized, as well as the aforementioned actuator.

In the construction, it is preferable that the frictional force exerted between the tip portion of the elastic piece and the ring-shaped rotor is greater than the force required to deform the elastic piece the tip portion of which is pressed against the ring-shaped rotor.

Alternatively, it is preferable that the driving force which the tip portion of the elastic piece of the ring-shaped elastic member exerts upon the ring-shaped rotor is equal to or smaller than frictional resistance which is gained by multiplying normal resistance which the tip portion thereof exerts upon the ring-shaped rotor, by frictional coefficient between the tip portion thereof and the ring-shaped rotor.

With the construction, any possibility of the slip between the tip portion of the elastic piece and the ring-shaped rotor is more efficiently lessened, realizing the ultrasonic motor with higher perfomance with higher power driving.

BRIEF DESCRIPTION OF THE DRAWINGS

These and other objects and features of the present invention will become clear from the following description taken in conjunction with preferred embodiments thereof with reference to the accompanying drawings.

DETAILED DESCRIPTION OF THE PREFERRED EMBODIMENTS

Figure 1:
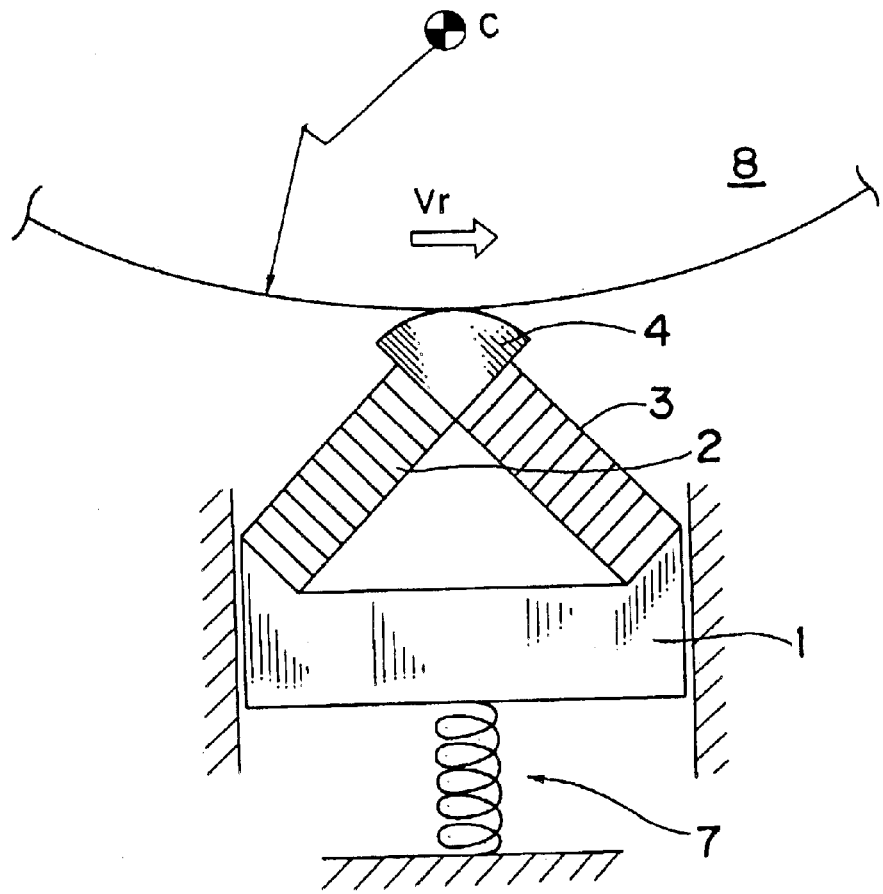
FIG. 1 is an explanatory view showing a conventional truss type ultrasonic actuator, as an ultrasonic driving mechanism.

Before the description of the preferred embodiments of the present invention proceeds, it is to be noted that like or corresponding parts are designated by like reference numerals throughout the accompanying drawings.

With reference to FIGS. 3 through 18, a description is made below upon an ultrasonic driving mechanism according to each of the preferred embodiments of the present invention.

First, with reference to FIGS. 3 through 13, it is explained about an ultrasonic actuator, as the ultrasonic driving mechanism, according to a first embodiment of the present invention.

Figure 3:
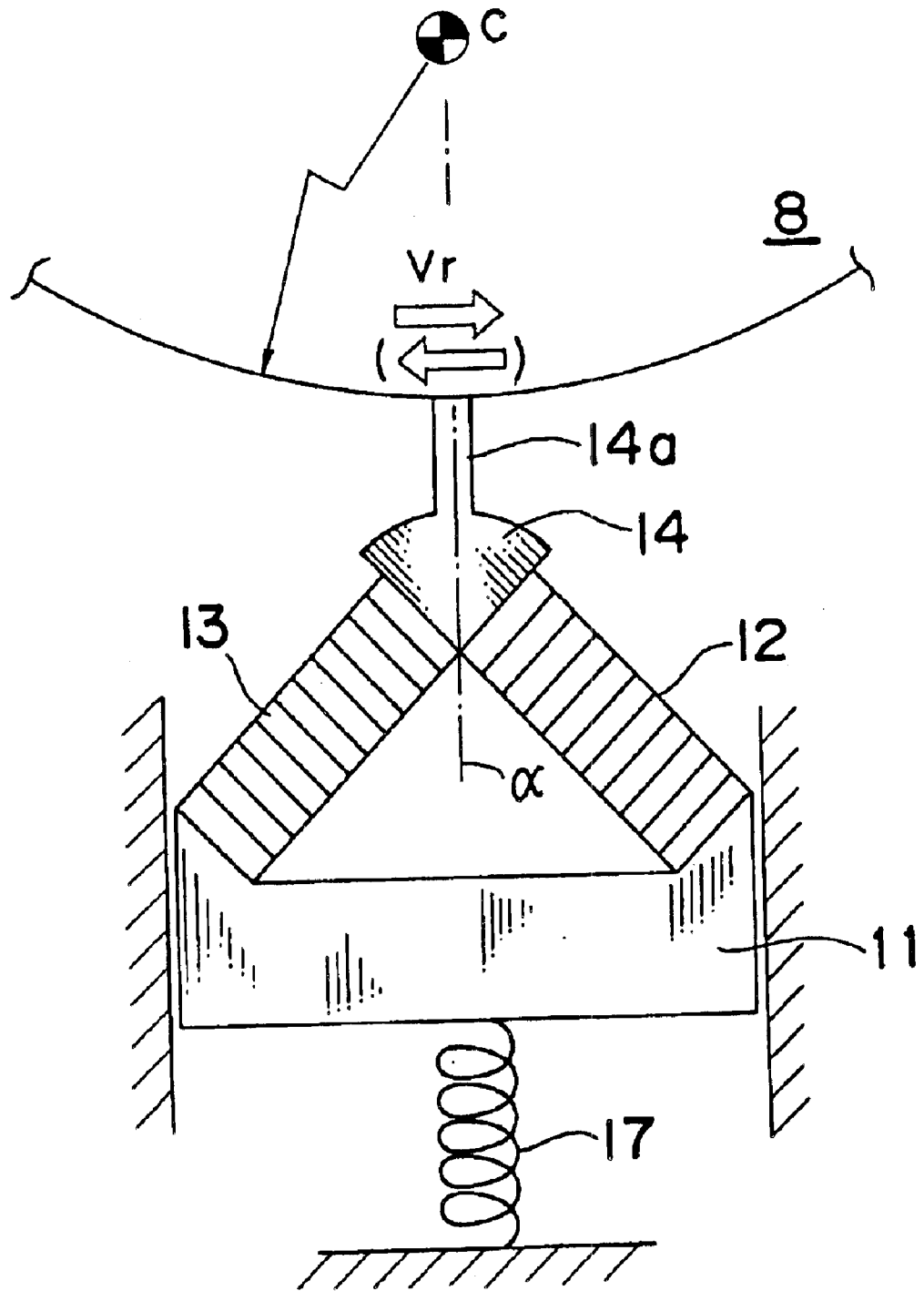
FIG. 3 is an explanatory view showing an ultrasonic actuator, as an ultrasonic driving mechanism, according to a first embodiment of the present invention.

Referring to FIG. 3, the ultrasonic actuator has a base 11 which is made of a metal, such as a stainless steel, which can be easily processed and has a high strength, and the ultrasonic actuator has a pair of piezoelectric vibrators 12 and 13 (i.e. first and second displacement portions) which are fixed to an upper surface of the base 11 with an adhesive agent. As the adhesive agent, it is preferable to employ an epoxy resin, which has a high degree of adhesion and a high degree of durability.

Each of the piezoelectric vibrators 12 and 13 are made of a plurality of plate-shaped piezoelectric elements, which are laminated, or layered, one over another, so as to be in the shape of a rod as shown in the figure. Upon reception of an external electrical signal, each of the piezoelectric vibrators 12 and 13 generates a predetermined output in the form of mechanical displacement.

At an intersection of the piezoelectric vibrators 12 and 13 which are arranged with a predetermined angle therebetween in the shape of a truss, there is mounted a resultant part 14 which is made of a rigid body, such as a metal or ceramics. The resultant part 14 is fixed to both of the piezoelectric vibrators 12 and 13 with an adhesive agent. The resultant part 14 synthesizes vibrations caused by the pair of piezoelectric vibrators 12 and 13 which vibrate with a predetermined phase difference therebetween, thus making an elliptical motion.

Figure 4:
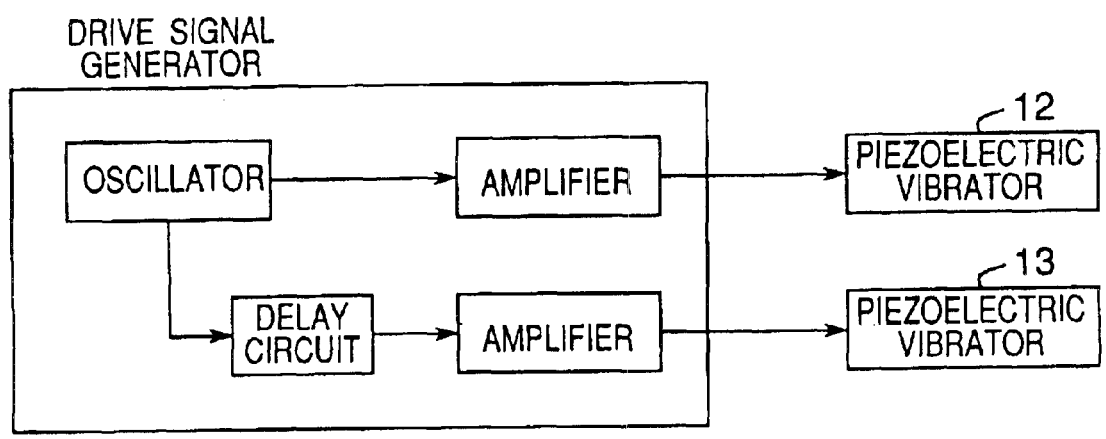
FIG. 4 is a block diagram showing a principle of drive, according to which the ultrasonic actuator of FIG. 3 is driven.

A block diagram of FIG. 4 schematically shows how to control the vibrations of the piezoelectric vibrators 12 and 13, with the phase difference provided therebetween. Namely, the vibrations thereof are controlled by a drive signal generator which has an oscillator and a pair of amplifiers. One of the amplifiers directly amplifies a signal outputted from the oscillator, and the other thereof amplifies a signal which is outputted from a delay circuit which receives the signal from the oscillator. That is, the drive signal generator generates two types of vibration signals having different phases to each other, and the two types of vibration signals are supplied to the pair of the piezoelectric vibrators 12 and 13, respectively. Thereby, the piezoelectric vibrators 12 and 13 expand and contract with a predetermined phase difference therebetween.

The delay circuit can control the amount of the delay so as to generate vibration signals having a predetermined phase difference. With the different phases, the vibration signals can cause reverse (or opposite) elliptical motions of the resultant part 14, with the vibration signals having the predetermined phase difference being supplied to the pair of piezoelectric vibrators 12 and 13, respectively.

As shown in FIG. 3, the resultant part 14 has an elastic projection (or elastic piece) 14a, and the elastic projection 14a is pressed against a surface of a member 8 to be driven (hereinafter, referred to as a to-be-driven member) by a pressurizing portion constituted by a spring 17. In the example shown in FIG. 3, the to-be-driven member 8 is a rotor which rotates about a rotational center "C". Alternatively, the to-be-driven member 8 can be a member which makes a linear motion.

In order to prevent the surface of the to-be-driven member (rotor) 8 from being worn out by the contact with the elastic projection 14a arragned on the front end of the resultant part 14, it is preferable to treat a surface of the to-be-driven member 8 by aluminization.

The pair of piezoelectric vibrators 12 and 13, the resultant part 14, and the elastic projection 14a are, respectively, disposed symmetrically with respect to an axis "α" which is generally perpendicular to a direction (i.e. direction shown by an arrow "Vr" of FIG. 3) in which the to-be-driven member 8 is driven to move or rotate. With the arrangement, as shown by the arrow "Vr" thereof, the to-be-driven member 8 can be rotated forward and backward by changing the direction of the elliptical motion of the resultant part 14.

The ultrasonic actuator shown in FIG. 3 is featured by the elastic projection 14a which projects from the front end of the resultant part 14. The elastic projection 14a is integrally formed of the resultant part 14 by making part of the resultant part 14 thinner.

It is preferable to make the resultant part 14 including the elastic projection 14a of a metal, such as tungsten, having a stable high frictional coefficient and having a high resistance to wear.

Figure 5:
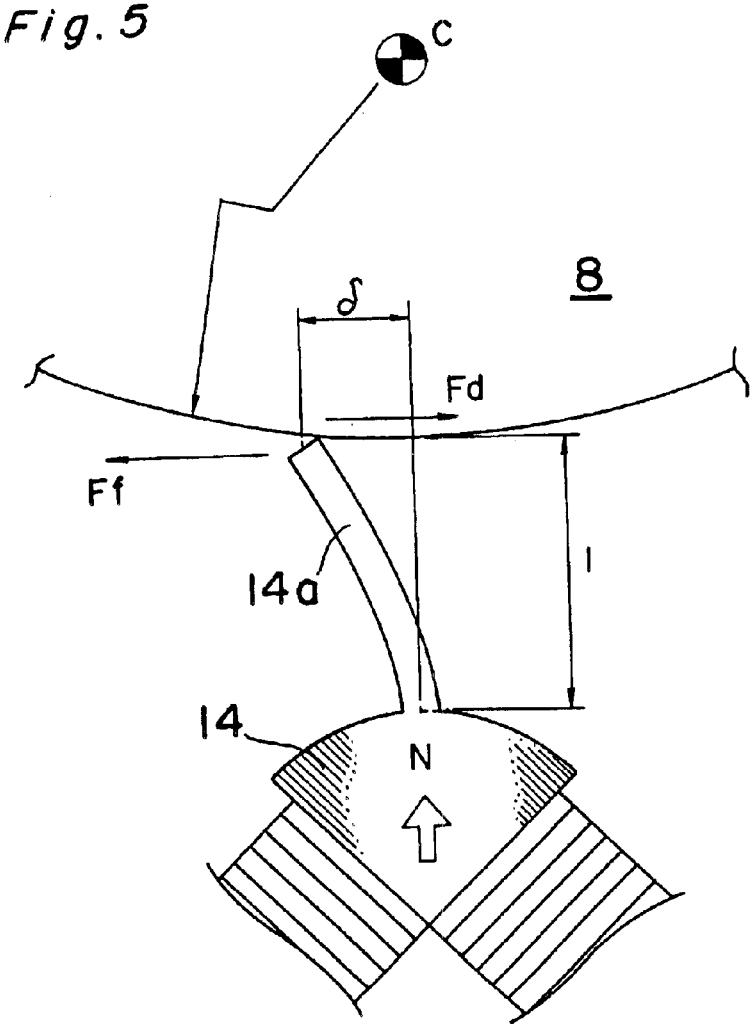
FIG. 5 is an explanatory view showing a flexure, or bending, of an elastic projection of the ultrasonic actuator of FIG. 3.

As shown in FIG. 5, the elastic projection 14a is able to elastically deform in the direction in which the to-be-driven member 8 is driven.

Figure 6:
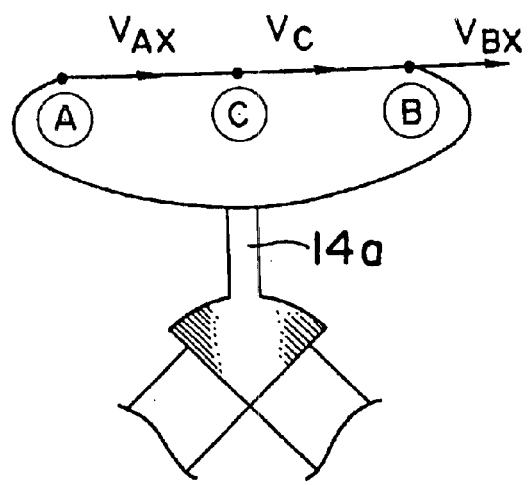
FIG. 6 is an explanatory view showing a locus of the elastic projection of the ultrasonic actuator of FIG. 3.

FIG. 6 shows a locus of the front end (or tip part) of the elastic projection 14a when the elastically deformable elastic projection 14a drives the to-be-driven member 8. A point "A" in the figure denotes a point at which the elastic projection 14a starts to contact the to-be-driven member 8. A point "B" therein denotes a point at which the elastic projection 14a is detached from the to-be-driven member 8. And a point "C" therein denotes the intermediate point between the point "A" and the point "B".

Figure 2:
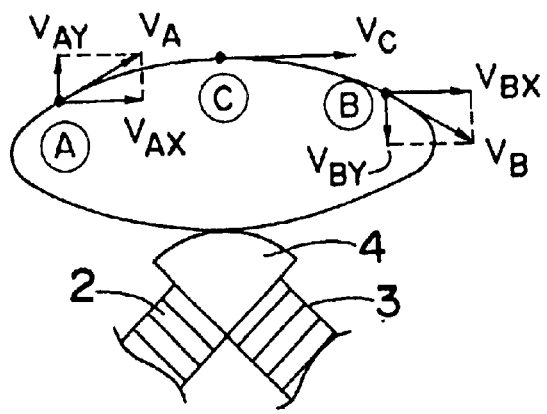
FIG. 2 is an explanatory view showing a locus of a resultant part of the ultrasonic actuator of FIG. 1.

While the elastic projection 14a contacts with the to-be-driven member 8, the elastic projection 14a flexes deformably. As a result, the locus of the front end of the elastic projection 14a does not form an ellipse, unlike the locus formed by the conventional resultant part 4 as shown in FIG. 2. That is, because the elastic projection 14a deformably follows the surface in movement of the to-be-driven member 8, components $V_{AX}$, $V_{BX}$, and $V_C$ of the speed at the points "A", "B" and "C" in the same direction (or in the X-axis direction) are almost equal to the circumferential speed of the to-be-driven member 8. Thus, it is possible to greatly reduce the slip (i.e. to effectively prevent the slip) between the elastic projection 14a and the to-be-driven member 8.

In addition, by optimizing the material forming the elastic projection 14a, and by optimizing the coefficient of elasticity (or elastic modulus) thereof, it is theoretically possible to realize a non-slip drive (or sticking drive) causing no slip at all between the elastic projection 14a and the surface of the to-be-driven member 8. Thereby, it is possible to prevent energy loss and to improve the efficiency and output of the actuator.

According to the non-slip drive, the elastic projection 14a does not slip on the surface of the to-be-driven member 8, so that the elastic projection 14a is prevented from being worn out by the surface of the to-be-driven member 8. As a result, the life span (or longevity) of the resultant part 14 as a whole becomes longer.

It is ideal that the elastic projection 14a does not slip on the surface of the to-be-driven member 8. Next, it will be explained below about a condition for preventing the slip therebetween.

FIG. 5 illustrates a momentary (or instantaneous) state in which the elastic projection 14a contacts with the surface of the to-be-driven member 8. If a driving force applied to the to-be-driven member 8 by the elastic projection 14a which has flexed by δ is Fd, then Fd ≈ Kl×δ, when δ is sufficiently small. In the equation, Kl denotes the flexural elastic modulus (or bending elastic coefficient) of the elastic projection 14a. Meanwhile, if a frictional resistance (or frictional resistant force) that the surface of the to-be-driven member 8 exerts on the elastic projection 14a is Ff at the moment, the following equation can be established: Ff=μ×N, where μ is the frictional coefficient between the elastic projection 14a and the to-be-driven member 8, and N is a vertical (or normal) resistant force that the elastic projection 14a exerts on the to-be-driven member 8.

That there is no slip between the to-be-driven member 8 and the elastic projection 14a, means that Fd is smaller than or equal to Ff.

That is, the following equation can be established: Kl×δ≦μ×N.

Therefore, the following four conditions can be enumerated, as the conditions for qualitatively preventing the slip between the to-be-driven member 8 and the elastic projection 14a. That is, (1) the flexural elastic modulus Kl of the elastic projection 14a is small;
(2) the flexural (or bending) amount δ of the elastic projection 14a is small;
(3) the frictional coefficient μ is great; and
(4) the vertical (or normal) resistant force N is great.

Figure 7:
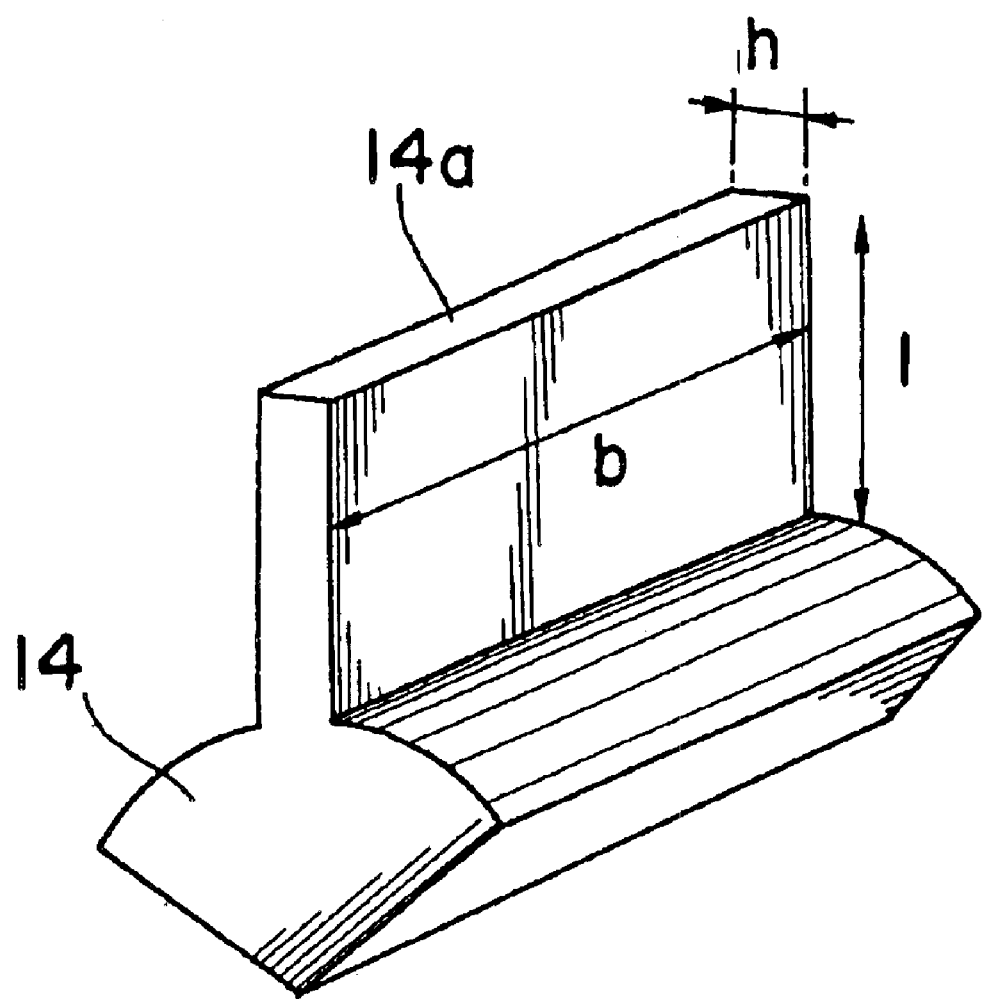
FIG. 7 is a perspective view of the elastic projection of the ultrasonic actuator of FIG. 3.

A table shown below exemplifies the flexural elastic modulus Kl of the elastic projection 14a of the embodiment. The items of the table are shown in FIG. 7.

TABLE

| h (mm) | 0.25 | 0.5 | 1 |
| b (mm) | 1.5 | 1.5 | 1.5 |
| l (mm) | 1.47 | 1.97 | 2.6 |
| E (kgf/mm²) | 2.20E+04 | 2.20E+04 | 2.20E+04 |
| Kl (kgf/mm) | 40.58093 | 134.8855 | 469.3901 |

If the elastic projection 14a is regarded as a cantilever with a span l, the displacement δ shown in FIG. 5 can be expressed by the following Equation 1:

$$\delta = Fl^3/3EI \qquad \text{Equation 1}$$

where F is the magnitude of an external force acting on the front end (or tip part) of the elastic projection 14a in the direction of the displacement δ; E is a vertical elastic modulus; and I is a sectional seconadary moment.

Meanwhile, if the flexural elastic modulus of the cantilever is Kl, considering that F=Kl×δ, the following Equation 2 is established:

$$\delta = F/Kl \qquad \text{Equation 2}$$

From the Equation 1 and Equation 2, Kl=3EI/l³. Because I=bh³/12, Kl=Ebh³/4l³. Utilizing these relationship, it is possible to find the flexural elastic modulus Kl as listed at the lowermost space of the table.

Figure 8:
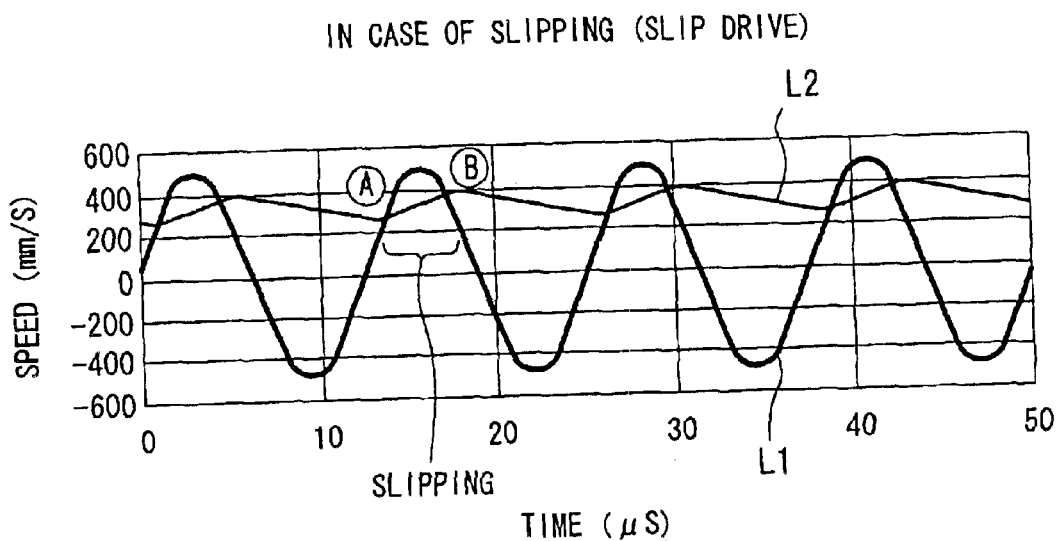
FIG. 8 is a graph showing a slip drive according to prior art.
Figure 9:
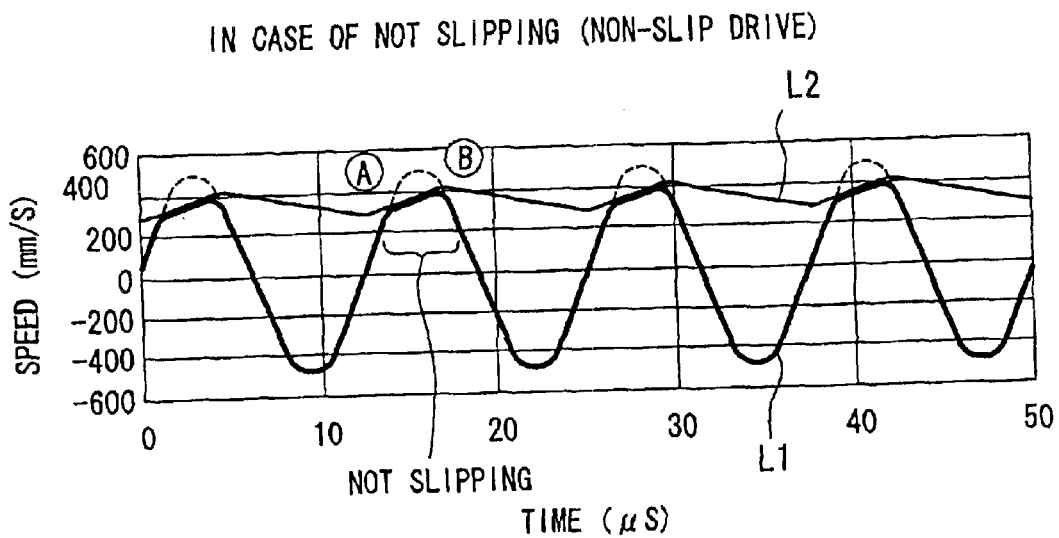
FIG. 9 is a graph showing a non-slip drive of the embodiment.

Next, with reference to graphs shown in FIGS. 8 and 9, the non-slip drive realized by the ultrasonic actuator having the elastic projection 14a, is compared with the slip drive of prior art.

FIG. 8 shows a relation between the speed of the resultant part 4 (see FIG. 1) and the speed of the rotor (or to-be-driven member) 8 in the conventional actuator which has no elastic projection, in the direction in which the rotor 8 is driven. Because the resultant part 4 moves elliptically, the component of the speed of the resultant part 4 in the driving direction is designated by a curve L1 having a configuration similar to a sine wave. The polygonal line L2 shows the speed of the rotor 8 in the direction in which the rotor 8 is driven. Points "A" and "B" shown in FIG. 8 correspond to the points "A" and "B" in FIG. 2, respectively. In the interval between the points "A" and "B", the resultant part 4 and the rotor (i.e. to-be-driven member) 8 are in contact with each other. As shown in the figure, the speed of the resultant part 4 in the driving direction is higher than that of the rotor 8 in the direction in which the rotor 8 is driven. This means that there occurs a slip between the rotor 8 and the resultant part 4.

On the other hand, FIG. 9 shows a relation between the speed of the elastic projection 14a and the speed of the rotor (i.e. to-be-driven member) 8 of the actuator (see FIG. 5) of the embodiment, in the direction in which the rotor 8 is driven. While the resultant part 14 moves elliptically, the resultant part 14a contacting the rotor 8 deforms elastically to the surface in the movement of the rotor 8 in the interval between the points "A" and "B". In the operation, there occurs no slip in the interval therebetween. Therefore, in the figure, the line L1 designating the speed of the elastic projection 14a in the direction in which it moves, and the line L2 designating the speed of the rotor 8 in the direction in which it is driven by the elastic projection 14a, overlap to each other over the interval therebetween.

By the way, as shown in the figure, the rotor 8 is accelerated to speed up over the interval therebetween, similar to the conventional art.

Next, with reference to FIGS. 10 through 13, it is explained about how to realize an efficient drive of the to-be-driven member 8 by employing resonance.

Each of the figures shows a view of an image of a computer simulation screen which analyzes the construction and function of the ultrasonic actuator, as the ultrasonic driving mechanism. In the computer simulation, with respect to a specified actuator model (i.e. specified driving mechanism model) which is identified by a shape (or configuration) and material thereof, each resonance point is observed and picked up when it vibrates with each different frequency. Utilizing the simulation, the shape and material of the actuator are selected in such a way that "the frequency of a resonance mode in which the elastic projection 14a resonates as a cantilever" is equal to "the frequency of a resonance mode in which two piezoelectric vibrators resonate with the same phase to each other".

Figure 11:
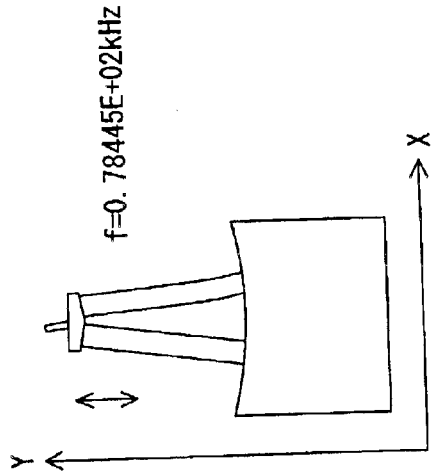
FIG. 11 is a view of an image of the computer simulation screen which explanatorily shows a state of resonance which is utilized in the embodiment.
Figure 13:
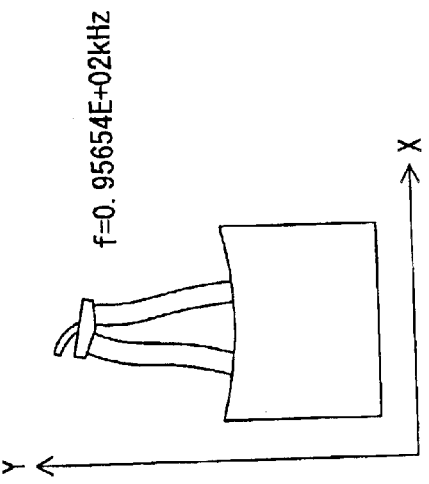
FIG. 13 is a view of an image of the computer simulation screen which explanatorily shows a state of resonance which is utilized in the embodiment.
Figure 10:
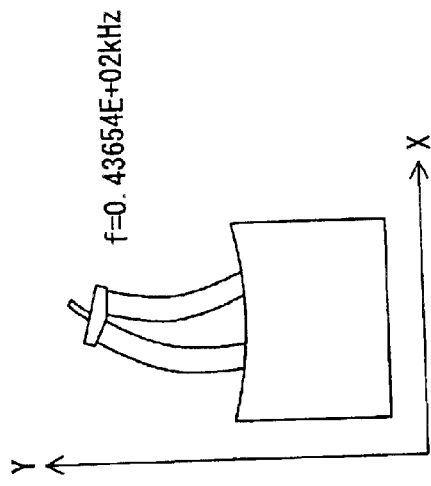
FIG. 10 is a view of an image of a computer simulation screen which explanatorily shows a state of resonance which is utilized in the embodiment.
Figure 12:
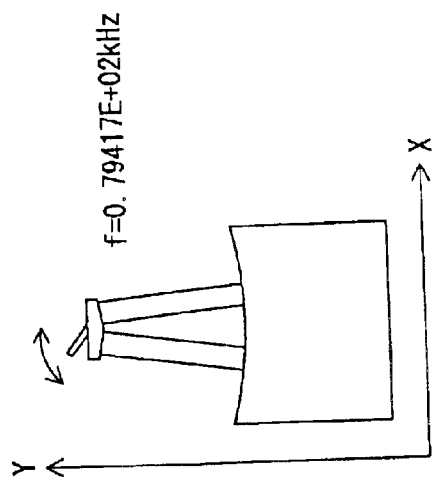
FIG. 12 is a view of an image of the computer simulation screen which explanatorily shows a state of resonance which is utilized in the embodiment.

FIGS. 10 through 13 show four resonance points with respect to the specified actuator model selected in the aforementioned manner. FIG. 11 shows a state in which the pair of piezoelectric vibrators 12 and 13 resonate in a vertical direction (i.e. in an up and down direction in the figure) with the same phase to each other. As understood in comparison with FIG. 3, the vertical direction is the direction which is generally perpendicular to the direction in which the to-be-driven member 8 is driven. The frequency at which the pair of piezoelectric vibrators 12 and 13 resonate in the state shown in FIG. 11, is about 78.4 kHz. Meanwhile, FIG. 12 shows a state in which the elastic projection 14a resonates as a cantilever. As understood in comparison with FIG. 3, the direction in which the elastic projection 14a resonates, is the direction in which the to-be-driven member 8 is driven. The frequency at which the pair of piezoelectric vibrators 12 and 13 resonate in the state shown in FIG. 12, is about 79.4 kHz which is close to 78.4 kHz explained above.

By making the two resonant frequencies coincident with each other as described above, the elliptical locus of the resultant part 14 is amplified, which results in realizing a very efficient actuator.

Figure 14:
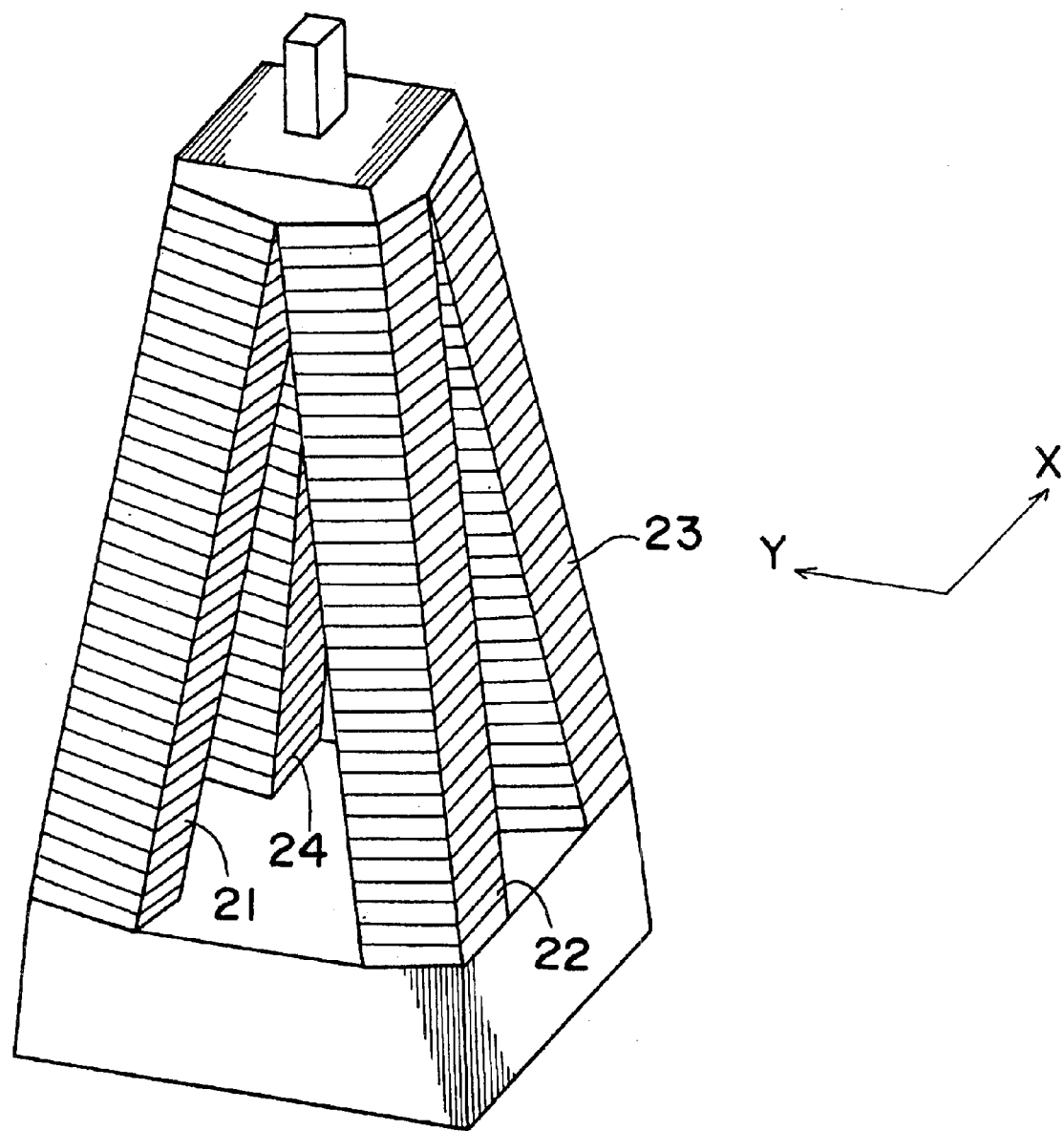
FIG. 14 is a perspective view showing the ultrasonic actuator, as the ultrasonic driving mechanism, according to a second embodiment of the present invention.

Next, with reference to FIG. 14, it is explained about the ultrasonic actuator, as the ultrasonic driving mechanism, according to a second embodiment of the present invention.

The ultrasonic actuator of FIG. 14, is different from that of FIG. 3 in that the former has four piezoelectric vibrators 21–24. According to the second embodiment, the to-be-driven member 8 can be driven in both an X-direction and a Y-direction orthogonal thereto.

That is, in order to drive the to-be-driven member 8 in the X-direction, the piezoelectric vibrators 21–24 are grouped into a first group (first displacement portion) having a pair of piezoelectric vibrators 21 and 22, and a second group (second displacement portion) having a pair of piezoelectric vibrators 23 and 24. In the arrangement, the pair of piezoelectric vibrators in each of the first group and the second group are vibrated with the same phase to each other, and at the same time the first group and the second group are vibrated with phases different from each other. As a result, the to-be-driven member 8 is driven in the X-direction.

On the other hand, in order to drive the to-be-driven member 8 in the Y-direction, the piezoelectric vibrators 21–24 are grouped into a first group (first displacement portion) having a pair of piezoelectric vibrators 21 and 24, and a second group (second displacement portion) having a pair of piezoelectric vibrators 22 and 23. In the arrangement, the pair of piezoelectric vibrators in each of the first group and the second group are vibrated with the same phase to each other, and at the same time the first group and the second group are vibrated with phases different from each other. As a result, the to-be-driven member is driven in the Y-direction.

Figure 15:
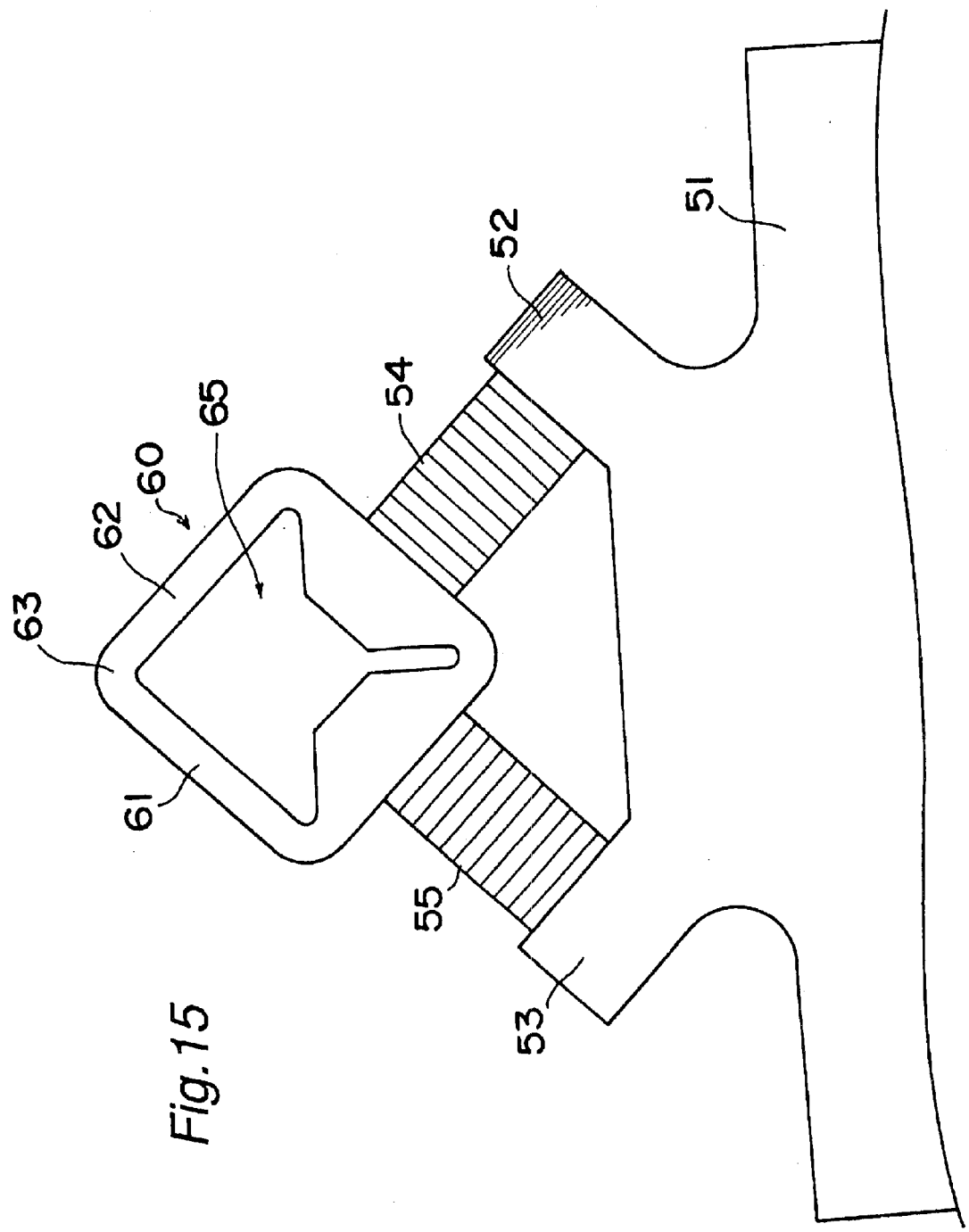
FIG. 15 is an explanatory view showing the ultrasonic actuator according to a first modification to the first embodiment.
Figure 16:
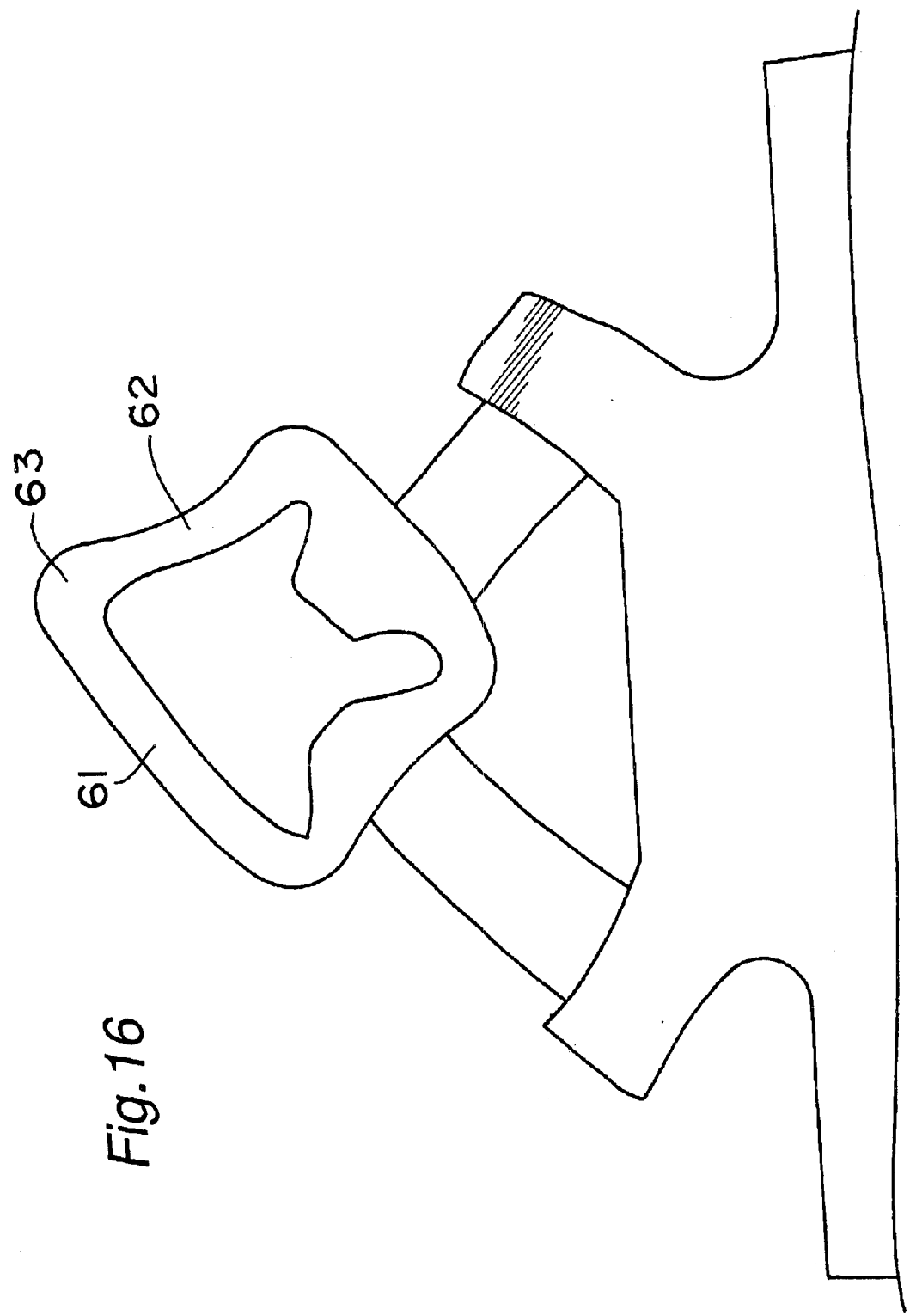
FIG. 16 is an explanatory view showing the ultrasonic actuator of FIG. 15, in which the resultant part is deformed.
Figure 17:
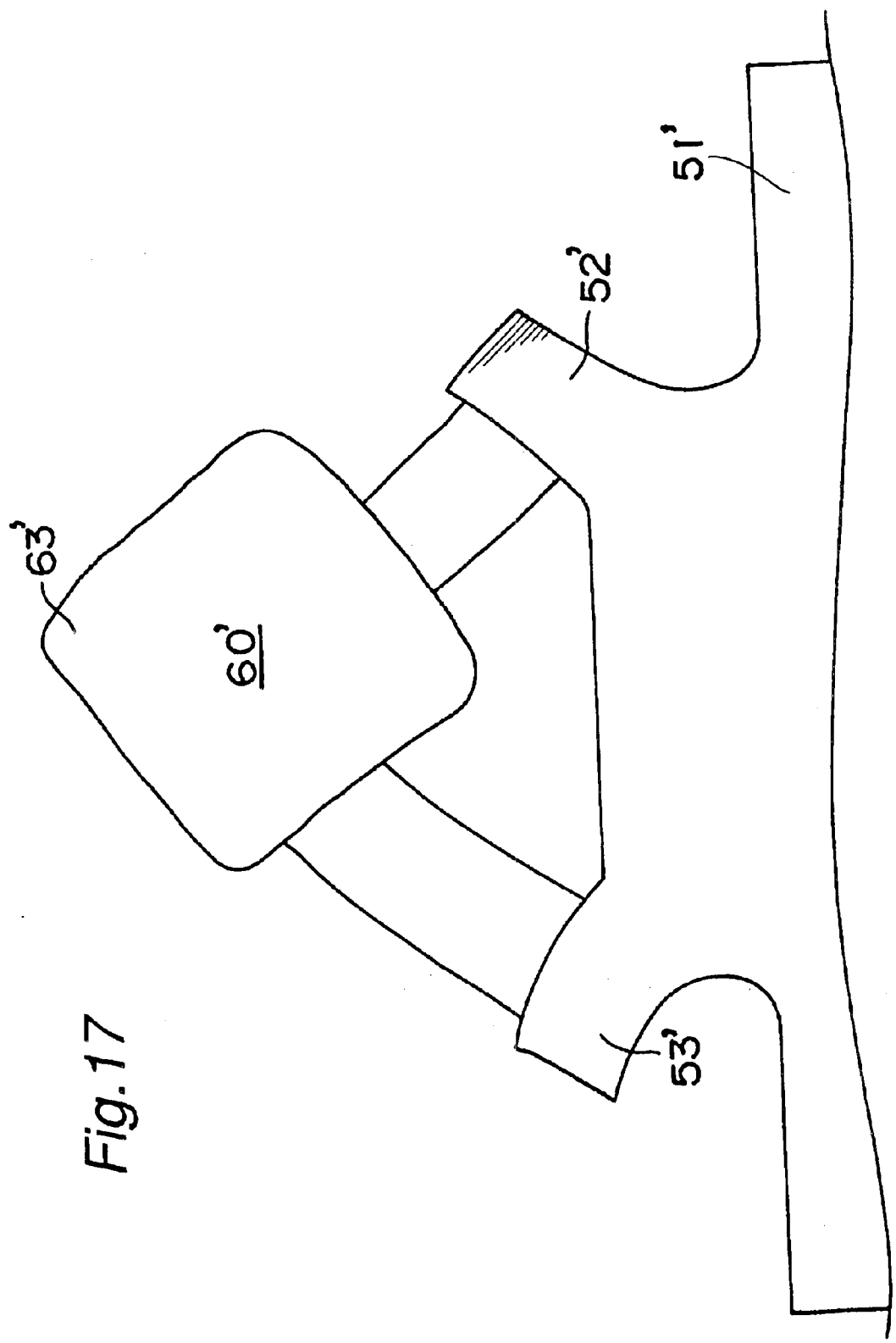
FIG. 17 is an explanatory view showing the ultrasonic actuator according to a second modification to the first embodiment.

Next, with reference to FIGS. 15 through 17, it is explained about two modifications to the first embodiment.

First, with reference to FIGS. 15 and 16, the description is made below upon a first modification thereto. In this modification, an upper part of the base 51 has a pair of projections 52 and 53, and a pair of piezoelectric vibrators 54 and 55 are bonded to the projections 52 and 53, respectively, in the shape of a truss. The resultant part 60 is bonded to an intersection of, the pair of piezoelectric vibrators 54 and 55. The resultant part 60 has an opening 65, by the configuration of which the resultant part 60 has thin portions 61 and 62 connected to each other at a corner 63.

The corner 63 functions as an elastic deformation part which corresponds to the elastic projection 14a of FIG. 3. That is, as shown in FIG. 16, the thin portions 61 and 62 can deform, so that the corner 63 can be displaced (or moved from its original position) in the direction in which the to-be-driven member is driven. Namely, the corner 63 can have a displacement so as to follow the surface in motion of the to-be-driven member 8, and the aforementioned non-slip drive is realized.

Next, with reference to FIG. 17, the description is made below upon a second modification to the first embodiment.

That is, the base 51' has a pair of projections 52' and 53' which are similar to the projections 52 and 53 in appearance of the first modification, but the pair of projections 52' and 53' are elastically deformable. According to this construction, even if the resultant part 60' has no opening, and even if the corner 63' of the resultant part 60' is not formed elastically deformable, the entire resultant part 60' can have a displacement in the driving direction, thanks to the elastic deformation of the projections 52' and 53'. As a result, the aforementioned non-slip drive (or sticking drive) is realized as well.

Alternatively, the aforementioned features of the first modification and the second modification can be combined to each other into a third modification.

The present invention is applicable not only to the aforementioned ultrasonic actuator, as the ultrasonic driving mechanism, of truss type, but also to any other types of driving mechanisms which employ vibrations of electrical-mechanical energy conversion elements (or electrical-mechanical energy transducers) such as piezoelectric elements as mentioned above.

Figure 18:
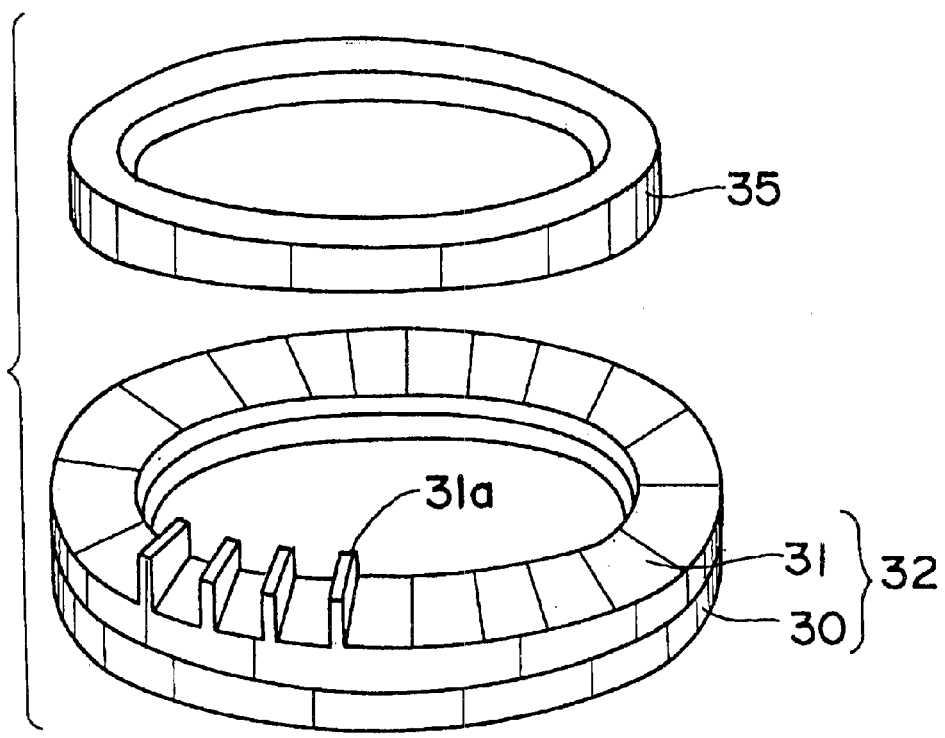
FIG. 18 is an exploded perspective view showing an ultrasonic motor, as the ultrasonic driving mechanism, according to a third embodiment of the present invention.

Next, with reference to FIG. 18, it is explained about an ultrasonic motor, as the ultrasonic driving mechanism, according to a third embodiment of the present invention.

FIG. 18 is an exploded perspective view of the ultrasonic motor, ring-shaped, of progressive wave type. The ultrasonic motor has a stator ring 32 which is composed of a ring-shaped piezoelectric vibrator 30 and a ring-shaped elastic member 31 combined to the piezoelectric vibrator 30; and the ultrasonic motor has a rotor 35 which is pressed against the elastic member 31 of the stator ring 32. The stator ring 32 and the rotor 35 are pressed against each other by pressing means.

When the piezoelectric vibrator 30 is vibrated with a predetermined electrical signal being supplied thereto, progressive waves are generated on the surface of the elastic member 31. Thereby, the rotor 35 is driven to rotate. The principle of this operation has been generally known. The ultrasonic motor according to the embodiment is featured by a provision of a plurality of elastic deformable projections 31 a on the upper surface of the elastic member 31 which are pressed against the lower surface of the rotor 35. The plurality of elastic deformble projections 31 a are arranged in the direction along its circumference and in the direction in which the rotor 35 is rotated. With the arrangement, a non-slip drive (or sticking drive) is achieved, as well as the non-slip drive achieved by the aforementioned ultrasonic actuator.

Incidentally, FIG. 18 shows four elastic projections 31 a only; however, more than four elastic projections 31 a are actually arranged on the entire circumference of the ring-shaped elastic member 31 at regular intervals. The ultrasonic motor of progressive wave type employing the ring-shaped components can be so constructed that the to-be-driven member can be rotated forward and backward (or in two directions).

Although the present invention has been fully described in connection with the preferred embodiments thereof with reference to the accompanying drawings, it is to be noted that various other changes and modifications are also apparent to those skilled in the art.

For example, in each of the aforementioned first and second embodiments, the elliptical vibration is transmitted to the resultant part 14, 60 and 60' by utilizing the vibrations from the displacement portions constituted by the piezoelectric elements. Alternatively, the elliptical vibration can be transmitted to the resultant part 14, 60 and 60' by utilizing vibrations from the displacement portions which can be constituted by any other electrical-mechanical energy conversion elements (or electrical-mechanical energy transducers) such as magnetostrictive elements, instead of the piezoelectric elements.

Such changes and modifications are to be understood as included within the scope of the present invention as defined by the appended claims unless they depart therefrom.

What is claimed is:

1. A driving mechanism comprising:
   a base;
   a first displacement part which has a pair of ends and which can expand and contract between the pair thereof, in which one of the pair is supported by the base;
   a second displacement part which has a pair of ends and which can expand and contract between the pair thereof, in which one of the pair is supported by the base; and
   a resultant part which connects the other of the pair of the first displacement part and the other of the pair of the second displacement part to each other, in which the resultant part has a contact part that contacts a body to be driven by the contact part, wherein
   the contact part can elastically deform in a direction in which the body is driven by the contact part, and
   material and configuration of the base, of the first displacement part, of the second displacement part, and of the resultant part are selected so that resonant frequency of the resultant part in the direction in which the body is driven is generally equal to resonant frequency of the first displacement part and the second displacement part in a direction perpendicular to the direction in which the body is driven.

2. The driving mechanism as claimed in claim 1, which further comprises a driver which supplies the first displacement part with a first driving signal and which supplies the second displacement part with a second driving signal, in which the first driving signal and the second driving signal have predetermined different phases to each other.

3. The driving mechanism as claimed in claim 2, wherein the first driving signal and the second driving signal have frequencies which belong to a region of ultrasonic.

4. A driving mechanism comprising:
   a base;
   a first displacement part which has a pair of ends and which can expand and contract between the pair thereof, in which one of the pair is supported by the base;
   a second displacement part which has a pair of ends and which can expand and contract between the pair thereof, in which one of the pair is supported by the base; and
   a resultant part which connects the other of the pair of the first displacement part and the other of the pair of the second displacement part to each other, in which the resultant part has a contact part that contacts a body to be driven by the contact part,
   wherein the contact part can elastically deform in a direction in which the body is driven by the contact part, and
   the driving mechanism further comprising a driver which supplies the first displacement part with a first driving signal having a first phase and which supplies the second displacement part with a second signal having a second phase, in which the first phase is in one of a first state and in which the first phase is faster than the second phase by a predetermined phase difference, and a second state in which the first phase is slower than the second phase by a predetermined phase difference.

5. The driving mechanism as claimed in claim 1, wherein the first displacement part, the second displacement part, the resultant part, and the contact part are provided generally symmetrically with respect to an axis which is generally perpendicular to the direction in which the body is driven, and
   wherein the body can be driven forward and backward by the contact part.

6. The driving mechanism as claimed in claim 1, wherein driving force which the contact part exerts upon the body is equal to or smaller than frictional resistance which is gained by multiplying normal resistance which the contact part exerts upon the body, by frictional coefficient between the contact part and the body.

7. An ultrasonic driving mechanism comprising:
   an object to be driven;
   at least one pair of electrical-mechanical energy transducers which vibrate with predetermined different phrases to cause a resultant elliptical vibration, in which the electrical-mechanical energy transducers are provided generally symmetrically with respect to an axis that is generally perpendicular to a direction in which the object is driven; and an elastically deformable part which is provided generally symmetrically with respect to the axis, in which the resultant elliptical vibration is transmitted to the object via the elastically deformable part, wherein the object can be driven forward and backward by the elastically deform, and material and configuration of the at least one pair of electrical-mechanical energy transducers and of the elastically deformable part are selected so that resonant frequency of the elastically deformable part in the direction in which the object is driven is generally equal to resonant frequency of the at least one pair of electrical-mechanical energy transducers in a direction perpendicular to the direction in which the object is driven.

8. The driving mechanism as claimed in claim 4, wherein the first driving signal and the second driving signal have frequencies which belong to a region of ultrasonic.

9. The driving mechanism as claimed in claim 4, wherein the first displacement part, the second displacement part, the resultant part, and the contact part are provided generally symmetrically with respect to an axis which is generally perpendicular to the direction in which the body is driven, and the body can be driven forward and backward by the contact part.

10. The driving mechanism as claimed in claim 4, wherein driving force which the contact part exerts upon the body is equal to or smaller than frictional resistance which is gained by multiplying normal resistance which the contact part exerts upon the body, by frictional coefficient between the contact part and the body.

11. A driving mechanism comprising:

a base;

a first displacement part which has a pair of ends and which can expand and contract between the pair thereof, in which one of the pair is supported by the base;

a second displacement part which has a pair of ends and which can expand and contract between the pair thereof, in which one of the pair is supported by the base;

a resultant part which connects the other of the pair of the first displacement part and the other of the pair of the second displacement part to each other, in which the resultant part has a contact part that contacts a body to be driven by the contact part; and a driver, the driver supplying at least one of the first displacement part and the second displacement part with a driving signal so that a first phase of vibration of the first displacement part is in one of a first state in which the first phase thereof is faster than a second phase of vibration of the second displacement part and of a second state in which the first phase thereof is slower than the second phase thereof, wherein the contact part can elastically deform in a direction in which the body is driven by the contact part.

12. The driving mechanism as claimed in claim 11, wherein the first driving signal and the second driving signal have frequencies which belong to a region of ultrasonic.

13. The driving mechanism as claimed in claim 11, wherein the first displacement part, the second displacement part, the resultant part, and the contact part are provided generally symmetrically with respect to an axis which is generally perpendicular to the direction in which the body is driven, and wherein the body can be driven forward and backward by the contact part.

14. The driving mechanism as claimed in claim 11, wherein driving force which the contact part exerts upon the body is equal to or smaller than frictional resistance which is gained by multiplying normal resistance which the contact part exerts upon the body, by frictional coefficient between the contact part and the body.

15. An ultrasonic driving mechanism comprising:

an object to be driven;

at least one pair of electrical-mechanical energy transducers which vibrate with predetermined different phrases to cause a resultant elliptical vibration, in which the electrical-mechanical energy transducers are provided generally symmetrically with respect to an axis that is generally perpendicular to a direction in which the object is driven;

an elastically deformable part which is provided generally symmetrically with respect to the axis, in which the resultant elliptical vibration is transmitted to the object via the elastically deformable part; and a driver supplying at least one of the first displacement part and the second displacement part with a driving signal so that a first phase of vibration of the first displacement part is one of a first state in which the first phase thereof is faster than a second phase of vibration of the second displacement part and of a second state in which the first phase thereof is slower than the second phase thereof, wherein the object can be driven forward and backward by the elastically deformable part.

\* \* \* \* \*